Patented Apr. 24, 1951

2,550,438

UNITED STATES PATENT OFFICE 2,550,438

STABILIZED PARAFFIN WAX

Herman J. Zoeller, Union, N. J., assignor to Standard Oil Development Company, a corporation of Delaware No Drawing. Application March 7, 1947, Serial No. 733,187

2 Claims. (Cl. 106—270)

This invention relates to a novel paraffin wax composition and particularly to a method of preventing the development of objectionable color in such material.

It is well known that paraffin wax derived from certain crudes, particularly such crude oils as Panhandle crudes, Salt Flat crudes, or Reagan type crudes, tend to develop discoloration when subjected to heat or ultra-violet light. This is a highly undesirable property when the finished wax is to be used for various commercial purposes, and especially when it is to be employed in the packaging of foods. It is an object of the present invention to provide a means for stabilizing such wax products against deterioration and discoloration.

In accordance with this invention, refined paraffin waxes, which have been rendered white or colorless by the usual refining processes, are stabilized against the deteriorating effects of heat and light by incorporating therein a small proportion of a polymerized alkyl siloxane. Such dihydrocarbon silicones are considered to have the general structure

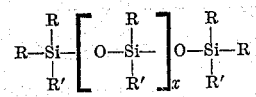

in which R and R' are hydrocarbon radicals such as alkyl, cycloalkyl, aryl, aralkyl, or alkaryl radicals, preferably having less than 20 carbon atoms, and $x$ is a positive integer greater than 1.

Among the many radicals represented by R and R', special reference may be made to methyl; ethyl; normal and iso propyl; normal, iso, secondary and tertiary butyl; and the various amyl, hexyl, heptyl, octyl and homologous groups.

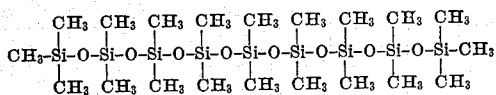

The type and degree of polymerization of the above-described siloxane compounds may be altered by the method of preparation, environment and related conditions, and they may be prepared by ways known to the art, for example, as described in Jour. Amer. Chem. Soc., vol. 63, page 798 (1941). It is also well known that it is impossible to ascertain the true molecular weight of these compounds, and therefore it is impossible to state definitely the degree of polymerization which a certain silicone polymer may have and which may be the optimum for stabilizing wax against discoloration.

Although the most suitable degree of polymerization cannot be determined, it has been found that the best results will be obtained when the polysiloxane possesses physical properties within the following range:

Viscosity_____ 50–1000 centistokes at 25° C.
Freezing point_____ Not greater than —50° C.
Specific gravity_____ 0.968–1.001 at 25° C.
Refractive index_____ 1.4030–1.427 at 25° C.
Flash point_____ 530–640° F.

The amount of the polysiloxanes which are generally effective in stabilizing wax compositions is from about 0.001% to 0.05%, based on the paraffin wax base. Quantities greater than about 0.05% will not readily dissolve in the wax and will tend to produce cloudiness.

The polysiloxanes may be incorporated in the melted wax at any time after completion of the refining process, preferably after the final filtration and before solidifying the same and packaging.

In the following example there is described a series of tests of the color stability of a refined wax containing varying quantities of a typical polysiloxane. It is to be understood that this example is given by way of illustration only and that the scope of the invention is not to be limited thereby.

Example

A refined paraffin wax was prepared by the following method: A paraffin distillate fraction was dewaxed to obtain a slack wax containing about 30% oil. The slack wax was then sweated to a crude scale wax, the latter treated with about 18 pounds of sulfuric acid of 104% concentration per 100 gallons of wax at 175° F. The spent acid and sludge were removed, and the acid-treated wax was neutralized, washed, sweated and filtered to produce a highly refined paraffin wax having a melting point of 132° F.

In the above-described wax were incorporated various quantities of a polydimethyl siloxane having the following properties:

Viscosity_____ 350 centistokes at 25° C.
Freezing point_____ —50° C.
Specific gravity_____ 0.972 at 25° C.
Refractive index_____ 1.0432 at 25° C.
Flash point_____ 625° F.

The blends thus produced were submitted to color stability and heat stability tests, as well as to inspections of melting point, tensile strength and other properties, the results and types of tests being shown in the following table:

| Blend Composition: | | | | | |
|---|---|---|---|---|---|
| Refined Wax, Weight Per Cent | 100 | 99.99 | 99.95 | 99.9 | 99.8 |
| Siloxane Oil, Weight Per Cent | None | 0.01 | 0.05 | 0.1 | 0.2 |
| Inspections: | | | | | |
| Melting Point, °F | 132 | 132 | 132 | 132 | 132 |
| Per Cent Oil—ASTM | 0.6 | 0.5 | 0.6 | 0.6 | 0.6 |
| Color, Saybolt | +30 | +30 | +30 | Cloudy | Cloudy |
| Heat Stability:[1] Color, Saybolt | 20½ T.R.[2] | +5 | +6 | +3 | +2 |
| Light Stability:[3] Color, Saybolt | 23 T.R.[2] | +15 | +16 | +12 | +9 |
| Tensile Strength, Pounds/¼ sq. in | 53 | 54 | 50 | 45 | 41 |
| U. S. P. Acid Test | Passed | Passed | Passed | Passed | Passed |

[1] Heat stability: The wax is maintained at 302° F. for 16 hours in the presence of a copper strip and the color of the wax then determined.
[2] Tag Robinson scale used, since value is below Saybolt color scale range.
[3] Light Stability: A cake of wax ¼ inch thick is exposed for 7 days to a Westinghouse Sterilamp at room temperature and the color then determined.

In each of these stability tests a final color of 0 Saybolt or higher is considered satisfactory.

The advantages to be secured by incorporating a polysiloxane in refined waxes in accordance with the present invention are readily apparent by the decided improvement secured with respect to color, which may be readily appreciated when Saybolt color and Tag Robinson color are correlated on an absolute color scale as follows:

| Absolute Color Scale | Saybolt Color | Tag Robinson |
|---|---|---|
| 0.3 | 30 | |
| 0.6 | 25 | |
| 1.1 | 20 | |
| 2.3 | 15 | |
| 3.3 | 10 | |
| 4.2 | 5 | |
| 5.3 | 0 | |
| 6.9 | −5 | |
| 8.3 | −10 | |
| 8.8 | | 22 |
| 13.2 | | 20 |
| 27.0 | | 18 |
| 41.0 | | 16 |
| 54.0 | | 14 |
| 81.0 | | 12 |
| 162.0 | | 10 |
| 350.0 | | 8 |
| 465.0 | | 6 |
| 700.0 | | 4 |

In the appended claims the expression "paraffin wax" is intended to refer to a refined petroleum wax of the crystalline type as obtained from a paraffin distillate cut, especially from paraffinic crude oils.

It is not intended that the invention be limited by any of the illustrations which are given above, but is to be limited solely by the terms of the appended claims.

I claim:

1. A refined colorless paraffin wax of a melting point of about 132° F. which has been treated with concentrated sulfuric acid and has incorporated therein about 0.001 to about 0.05% of a polydimethyl siloxane having the following properties:

| | |
|---|---|
| Viscosity | 50–1000 centistokes at 25° C. |
| Freezing point | Not greater than −50° C. |
| Specific gravity | 0.968–1.001 at 25° C. |
| Refractive index | 1.4030–1.427 at 25° C. |
| Flash point | 530–640° F. |

2. A refined colorless paraffin wax of a melting point of about 132° F. which has been treated with concentrated sulfuric acid and has incorporated therein about 0.001 to about 0.05% of a polydimethyl siloxane having the following properties:

| | |
|---|---|
| Viscosity | 350 centistokes at 25° C. |
| Freezing point | −50° C. |
| Specific gravity | 0.972 at 25° C. |
| Refractive index | 1.0432 at 25° C. |
| Flash point | 625° F. |

HERMAN J. ZOELLER.

REFERENCES CITED

The following references are of record in the file of this patent:

UNITED STATES PATENTS

| Number | Name | Date |
|---|---|---|
| 2,383,521 | Sowa | Aug. 28, 1945 |
| 2,416,504 | Trautman | Feb. 25, 1947 |